United States Patent [19]

Muraoka et al.

[11] Patent Number: 4,700,252
[45] Date of Patent: Oct. 13, 1987

[54] MAGNETIC THIN FILM HEAD

[75] Inventors: Hiroaki Muraoka, Yokohama; Seishi Sasaki, Nishinomiya; Ken Takahashi, Suita; Hiroshi Youda, Hirakata, all of Japan

[73] Assignee: Matsushita Electric Industrial Co., Ltd., Osaka, Japan

[21] Appl. No.: 661,252

[22] Filed: Oct. 15, 1984

[30] Foreign Application Priority Data

Oct. 20, 1983 [JP] Japan .................. 58-195241

[51] Int. Cl.[4] .......................... G11B 5/39; G11B 5/17
[52] U.S. Cl. .................................... 360/113; 360/123
[58] Field of Search ............... 360/110, 119, 113, 120, 360/121, 125, 126

[56] References Cited

U.S. PATENT DOCUMENTS

| 4,300,177 | 11/1981 | Koel et al. | 360/113 |
| 4,425,593 | 1/1984 | Postma | 360/113 |
| 4,488,194 | 12/1984 | Michel | 360/113 |
| 4,489,357 | 12/1984 | Van Ooijen et al. | 360/113 |

FOREIGN PATENT DOCUMENTS

| 91812 | 10/1983 | European Pat. Off. | 360/113 |
| 58-102324 | 6/1983 | Japan | 360/113 |
| 58-179927 | 10/1983 | Japan | 360/113 |

Primary Examiner—John H. Wolff
Assistant Examiner—Matthew J. Bussan
Attorney, Agent, or Firm—Spencer & Frank

[57] ABSTRACT

A magnetic thin film head used for perpendicular magnetic recording and reproduction. The head includes a magneto-resistive element and a flux guide made of high permeability thin film whose one end portion faces a perpendicular magnetic recording medium. The magnetic flux produced by the magnetization signal on the perpendicular magnetic recording medium is led to the magneto-resistive element through the flux guide. The head also includes electrodes for supplying an electric current londitudinally to the magneto-resistive element, and high permeability members for introducing the magnetic flux through the magneto-resistive element back to the perpendicular magnetic recording medium. The head further includes a exciting means for the flux guide.

4 Claims, 4 Drawing Figures

MAGNETIC THIN FILM HEAD

BACKGROUND OF THE INVENTION

1. Field of the Invention

The present invention relates to a magnetic thin film head utilizing the magnetic-resistive effect and suitable for recording and reproducing information on a perpendicular magnetic recording medium.

2. Description of the Prior Art

It is known that perpendicular magnetic recording is inherently more suitable for high density recording than longitudinal magnetic recording. However, the former has been involved in various problems in the reproduction operation. For example, for the reproduction with a wire-wound magnetic head, there have been proposed single pole heads and ring heads. When a ring head is used to reproduce short-wavelength signals that characterize the perpendicular recording, the head needs to have an extremely small gap length, resulting in a very low efficiency for the magnetic circuit of the head. If the turns of the winding are increased in order to enhance the sensitivity of reproduction, the self resonance frequency will fall due to the increased head inductance. On the other hand, the signal frequency rises with a decrease in recording wavelength, and a fall in the self resonance frequency of the magnetic head is extremely disadvantageous in reproducing signals. A single pole head cannot avoid the same problems of the wire-wound magnetic head.

The more serious common problem of electro-magnetic induction heads is a small reproduction output voltage when the recording medium is fed slow relative to the head, and thus increased turns of winding for counteracting the matter. On the other hand, in a multiple track arrangement where several magnetic heads are aligned, the wiring space poses a problem. In addition, when the thin film technology is used to fabricate wire-wound magnetic heads, the number of turns of winding is restricted, and a high-sensitivity magnetic head cannot be achieved.

In order to overcome the aforementioned problems, attention has been paid recently to a magnetic head utilizing the magneto-resisitive effect. One example of the conventional magneto-resisitive head is of a single element type, in which a strip of magneto-resisitive element is placed perpendicularly to the recording medium with a current conducted in the longitudinal direction of the element and the magnetic flux of the recording signal is incident on the element surface at right angles with respect to the longitudinal direction. This type of magneto-resisitive head is known to have the structure-dependent wavelength response characteristics solely determined by the width W of the magneto-resisitive element. In order for the magneto-resisitive head to reduce the wavelength loss sufficiently, the element width W needs to be made as small as the recording wavelength λ, and this is extremely disadvantageous for a head designed to handle short wavelength signals.

On the other hand, there is known a shielded magneto-resistive head in which a high permeability material is placed on both planes of the magneto-resistive element. This type of magneto-resistive head has substantially the same wavelength response characteristics as the conventional wire-wound ring head, and is known to be operable sensitively down to a range of relatively short wavelengths. In this structure, however, magnetic and electrical insulation is needed between the magneto-resistive element and the high permeability material, and the thicknesses g1 and g2 of the insulation layers on both sides correspond to the gap length of the conventional wire-wound ring head. In addition, in order to sufficiently reduce the gap loss for short wavelengths, which is approximately the product of the gap loss of g1 and the gap loss of g2, both g1 and g2 must be made extremely small. It is very difficult in such circumstances to form a small gap length without magnetic and electrical leakage. Moreover, for a perpendicular magnetic recording medium made of high conductivity material such as Co-Cr, electrical leakage between the magneto-resistive element and recording medium must be taken into account. In addition, the conventional magneto-resistive head requires disadvantageously the provision of an independent recording head.

SUMMARY OF THE INVENTION

It is an object of the present invention to provide a magneto-resistive thin film head which is rid of the aforementioned electrical leakage, magneto-resistive element loss and gap loss in perpendicular magnetic reproduction and which is capable of recording by itself on the perpendicular magnetic recording medium.

The magnetic thin film head according to the present invention comprises a magneto-resistive element with a current flowing in the longitudinal direction thereof so that a voltage is generated in response to a magnetic flux produced by a perpendicular magnetic recording medium and conducted to the element, a high permeability thin film for conducting the magnetic flux to the magneto-resistive element, a winding or a high permeability material including a winding for applying an excitation magnetic field to the high permeability thin film, and insulators for electrically insulating the high permeability thin film. The head is also capable of recording signals on the recording medium.

DESCRIPTION OF THE PREFERRED EMBODIMENT

An embodiment of the present invention will be described with reference to FIG. 1 and FIGS. 2A-2C. The magnetic thin film head of this invention is designed to perform perpendicular magnetic reproduction on a substantially double-layered perpendicular magnetic recording medium provided on its rear side with a first high permeability film or a first high permeability material. The head includes a second high permeability thin film having the magnetoresistive effect with a current conducted in its longitudinal direction. The upper end of the second magnetic thin film is coupled magnetically with a second high permeability material, while the lower end of the second high permeability thin film is coupled magnetically with the upper end section of a third high permeability thin film, with the lower end section thereof being in contact or brought close to the recording medium. The second magnetic film is insulated electrically from the third high permeability thin film. The third high permeability thin film is excited by at least one of the following methods.

(1) A conductive thin film is formed in the vicinity of the third high permeability thin film, but electrically isolated therefrom, so that it works as a winding for exciting the third high permeability thin film.

(2) A winding is provided around the second high permeability material so that it produces a magnetic field for exciting the third high permeability thin film.

(3) The third high permeability material is disposed to confront the recording medium with a winding provided thereon so that it produces a magnetic field for exciting the third high permeability thin film.

Figure 1:
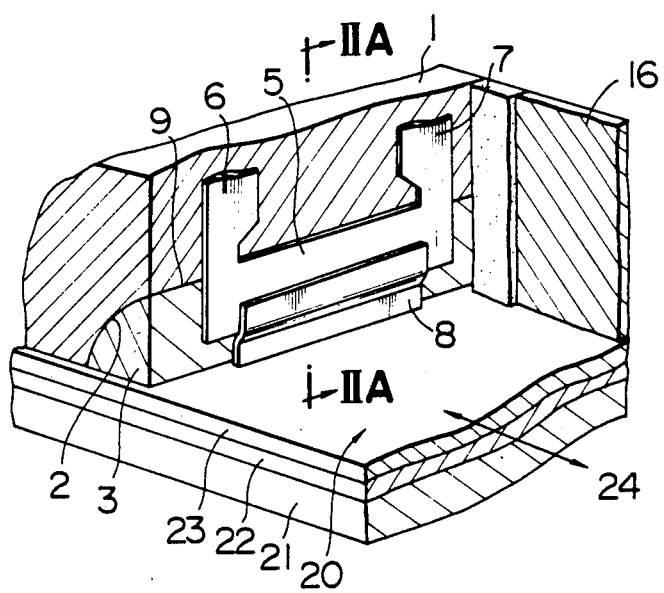
FIG. 1 is a sectional perspective view of the magnetic thin film head embodying the present invention.

Namely, as shown in FIG. 1, an insulative magnetic substrate or yoke 1 of ferrite or the like is provided with a cut groove 2 which is filled with a non-magnetic material 3 such as glass. After the filler material 3 has been finished to have the same thickness as the substrate 1, the surface is coated with an insulation layer (not shown) and then with a Ni-Fe alloy in a thickness of around 500 Å by an evaporation means. Using photographic etching technology, electrodes 6 and 7 are formed at both ends of a substantially rectangular shape magneto-resistive element 5 which is provided in parallel to the cut groove 2 formed in the magnetic substrate 1. The upper end of the magneto-resistive element 5 is coupled magnetically with the upper end section 9 of the groove 2, and the lower end of the element 5 is coupled magnetically with, but insulated electrically from, the upper section of a substantially rectangular shape high permeability thin film or flux guide 8 through an insulation layer (not shown). There is further provided a winding or a high permeability material having a winding for exciting the high permeability thin film 8, but it is not shown in FIG. 1, and it will be described in connection with FIGS. 2A, 2B and 2C.

A recording medium 20 is made of a perpendicular magnetic recording medium 23 of Co-Cr or the like overlaying a high permeability material 22 of Ni-Fe or the like with is coated over a base film 21 so as to complete a double-layered perpendicular magnetic recording medium. The perpendicular magnetic signal is recorded or reproduced while the recording medium 20 is moved in the direction shown by the arrow 24, with its surface being in contact with the lower end of the high permeability thin film 8.

Figure 2A:
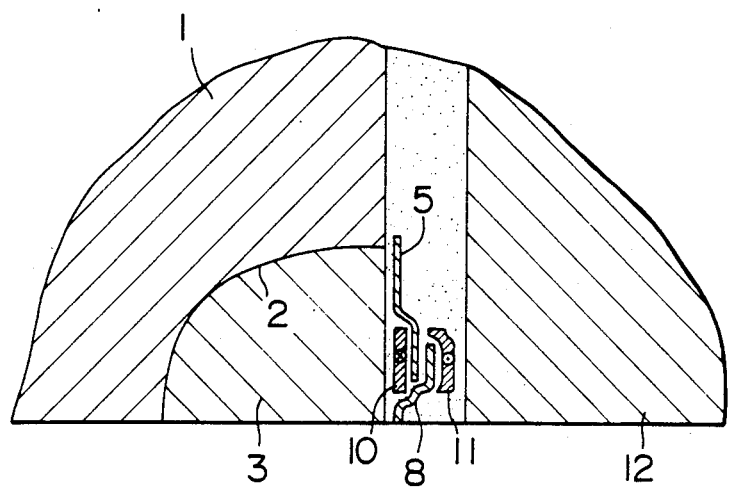
FIG. 2A, 2B and 2C are cross-sectional views of the excitation means in the head.

Next, the method of exciting the high permeability thin film 8 will be described as an example with reference to FIG. 2A showing the cross section of the magneto-resistive element 5 taken along the center line IIA—IIA of FIG. 1. High conductivity thin films 10 and 11 made of, for example, Al, Au or Cr are formed between the high permeability thin film 8 and magneto-resistive element 5, between the element 5 and substrate 1, and between the film 8 and element 5. These conductive films 10 and 11 are supplied with currents in opposite directions. As a result, the high permeability thin film 8 is excited, and information is recorded in the perpendicular magnetic recording medium 23. Reference number 12 denotes a cover made of a non-magnetic, non-conductive material for protecting the above-mentioned thin film structure, and it is fixed to the substrate 1 using a bonding resin. The thin films 10 and 11, magneto-resistive element 5 and high permeability thin film 8 are interposed by insulators.

Figure 2B:
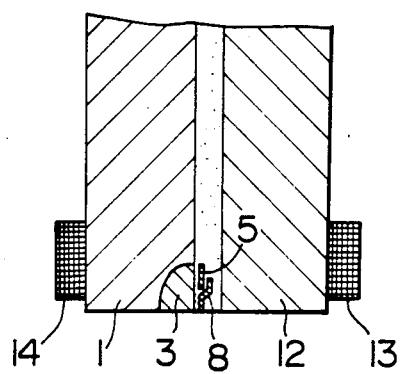

FIG. 2B shows the method of forming a winding 13 (14) around the substrate 1 and cover 12. In this embodiment, the substrate 1 is magnetized by supplying a current to the winding. The magnetic field produced by the magnetized substrate 1 magnetizes the high permeability thin film 8.

Figure 2C:
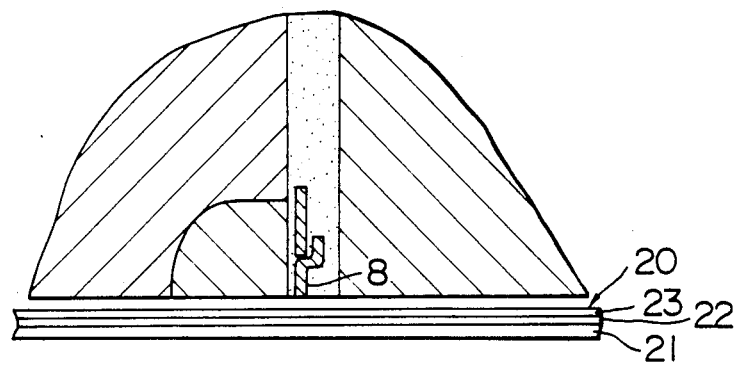
Figure 2C:
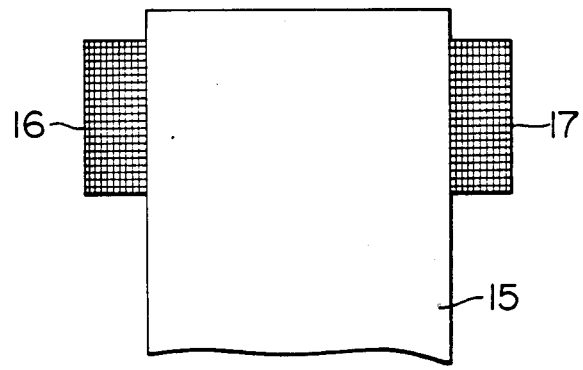

FIG. 2C shows another case in which a high permeability material 15 is disposed to confront the recording medium 20 and a winding 16 (17) is formed around the material 15. In this embodiment, the winding 16 (17) is supplied with a current so that the high permeability material 15 produces a magnetic field, which in turn magnetizes the high permeability thin film 8.

It is known that a loss of reproduced magnetic flux comparable in magnitude with the gap loss of a ring head is created in terms of the relation between the thickness of the high permeability thin film 8 and the wavelength of magnetizing signal in the recording medium. Namely, for the thichness Tm of the high permeability thin film 8 and the recording wavelength $\lambda$, the reproduced magnetic flux in case of sinusoidal magnetization has the maximum value $\phi P$ expressed as follows.

$$\phi P = \frac{K \sin(\pi Tm/\lambda)}{(\pi Tm/\lambda)}$$

where K is a constant.

Accordingly, the reproduced magnetic flux suffers a significant loss unless the thickness of the high permeability thin film 8 is smaller than the recording wavelength, i.e., $Tm < \lambda$. The present invention provides the high permeability thin film in the optimum thickness within the above range depending on each purpose of the head.

Although in the foregoing embodiment the substrate having a cut groove has been shown, it is also possible to make a structure with its cut groove being enlarged in the extreme, i.e., the surface of the high permeability material confronting the recording medium is entirely spaced apart with a non-magnetic material having an appropriate thickness.

The present invention is effective in various ways as follows.

(1) The magneto-resistive element arranged in a closed magnetic path eliminates the loss of width of the element, allowing the wavelength characteristics without gap loss as seen in the conventional magnetic head.

(2) The single magnetic head used for both recording and reproduction eliminates the need for the precise positional adjustment between the recording and reproducing heads when provide separately.

(3) The single magnetic head reduces the cost of the overall recording and reproduction apparatus.

What is claimed is:

1. A magnetic playback/record head for use with a double layered perpendicular magnetic recording medium including a high-permeability layer disposed on a base film and a high-coercivity layer having an axis of easy magnetization in the direction of its thickness and disposed on said high-permeability layer, said head comprising:
a substantially rectagular-shaped high-permeability thin film flux guide placed vertically to an operative surface of said head which faces said recording medium during use, said flux guide having a lower side edge which extends parallel to and is flush with said operative surface of said head;
a substantially rectangular-shaped magneto-resistive thin film extending parallel to said flux guide and having a lower side edge which is parallel to and displaced upwardly from said operative surface, said magneto-resistive thin film being magnetically coupled with said flux guide in that said lower side edge portion of said magneto-resistive thin film is adjacently opposite an upper side edge portion of said flux guide which is farthest from said operative surface;

means for supplying a sensing current which flows through said magneto-resistive thin film in a playback operation, with the flow direction of said sensing current being substantially in a longitudinal direction of said magneto-resistive thin film and in parallel with said operative surface;

a high-permeability flux return yoke having one end magnetically coupled with an upper side edge portion of said magneto-resistive thin film farthest from said operative surface, and another end thereof positioned to be spaced from said magneto-resistive thin film and said thin film flux guide and flush with said operative surface, so that when said operative surface is adjacent said recording medium, said yoke forms a substantially closed magnetic path with said flux guide, said magneto-resistive thin film and said high-permeability layer of said magnetic recording medium;

a high-conductivity thin film coil means, disposed adjacently around said flux guide, for exciting said flux guide during a recording operation; and a non-magnetic separating member disposed in the space between said another end of said flux return yoke and said magneto-resistive and flux guide thin films, and extending to said operative surface.

2. A magnetic playback/record head according to claim 1 wherein said thin film coil means comprises a pair of thin film conductors disposed respectively on opposite sides of said flux guide thin film and parallel thereto.

3. A magnetic playback/record head according to claim 2 wherein: said high-permeability flux return yoke is a magnetic substrate having a first surface parallel to said thin films, a second surface flush with said operative surface of said head, and a cut groove at the intersection of and extending to said first and second surfaces, whereby said one end of said yoke is the portion extending to said first surface and said another end is the portion flush with said operative surface of said head; said separating member is a layer of non-magnetic material which fills said groove and extends flush with each of said first and second surfaces of said substrate; and said thin films are disposed on said first surface of said substrate with said upper side edge portion of said magneto-resistive thin film overlying said one end of said yoke and the remaining portion of said magneto-resistive thin film and each of the other of said thin films overlying only said layer of non-magnetic material.

4. A magnetic head according to claim 1, wherein the thickness (Tm) of said high permeability thin film is smaller than the recording wavelength ($\lambda$).

* * * * *